(12) United States Patent
Jenks et al.

(10) Patent No.: US 8,584,241 B1
(45) Date of Patent: Nov. 12, 2013

(54) COMPUTER FORENSIC SYSTEM

(75) Inventors: Joshua C. Jenks, Alexandria, VA (US);
Evan M. Teran, South Riding, VI (US);
Samuel F. Stover, Orrtanna, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 430 days.

(21) Appl. No.: 12/854,479

(22) Filed: Aug. 11, 2010

(51) Int. Cl.
*G06F 11/00* (2006.01)

(52) U.S. Cl.
USPC .............................................. 726/24; 726/23

(58) Field of Classification Search
None
See application file for complete search history.

(56) References Cited

U.S. PATENT DOCUMENTS

| | | |
|---|---|---|
| 2004/0039968 A1* | 2/2004 | Hatonen et al. .................. 714/39 |
| 2005/0193173 A1 | 9/2005 | Ring et al. |
| 2005/0193428 A1 | 9/2005 | Ring et al. |
| 2005/0204205 A1 | 9/2005 | Ring et al. |
| 2005/0229250 A1 | 10/2005 | Ring et al. |
| 2011/0041179 A1* | 2/2011 | St Hlberg ........................ 726/23 |

\* cited by examiner

*Primary Examiner* — Brandon Hoffman
*Assistant Examiner* — Nega Woldemariam
(74) *Attorney, Agent, or Firm* — Howard IP Law Group, PC

(57) ABSTRACT

A method for processing, analyzing live and off-line physical memory in order to determine the presence, and initiate the removal, of malware from the system. The internal structures within the host operating system, the drivers, and the user-space executables can be utilized to self-verify the integrity of the processes, their related structures, and the binary execution paths residing on the system. Additionally, these same characteristics are employed for use in comparison with other baseline malicious and benign datasets as well as datasets from live systems to automatically identify malware and remove it from a targeted computer system.

15 Claims, 11 Drawing Sheets

200

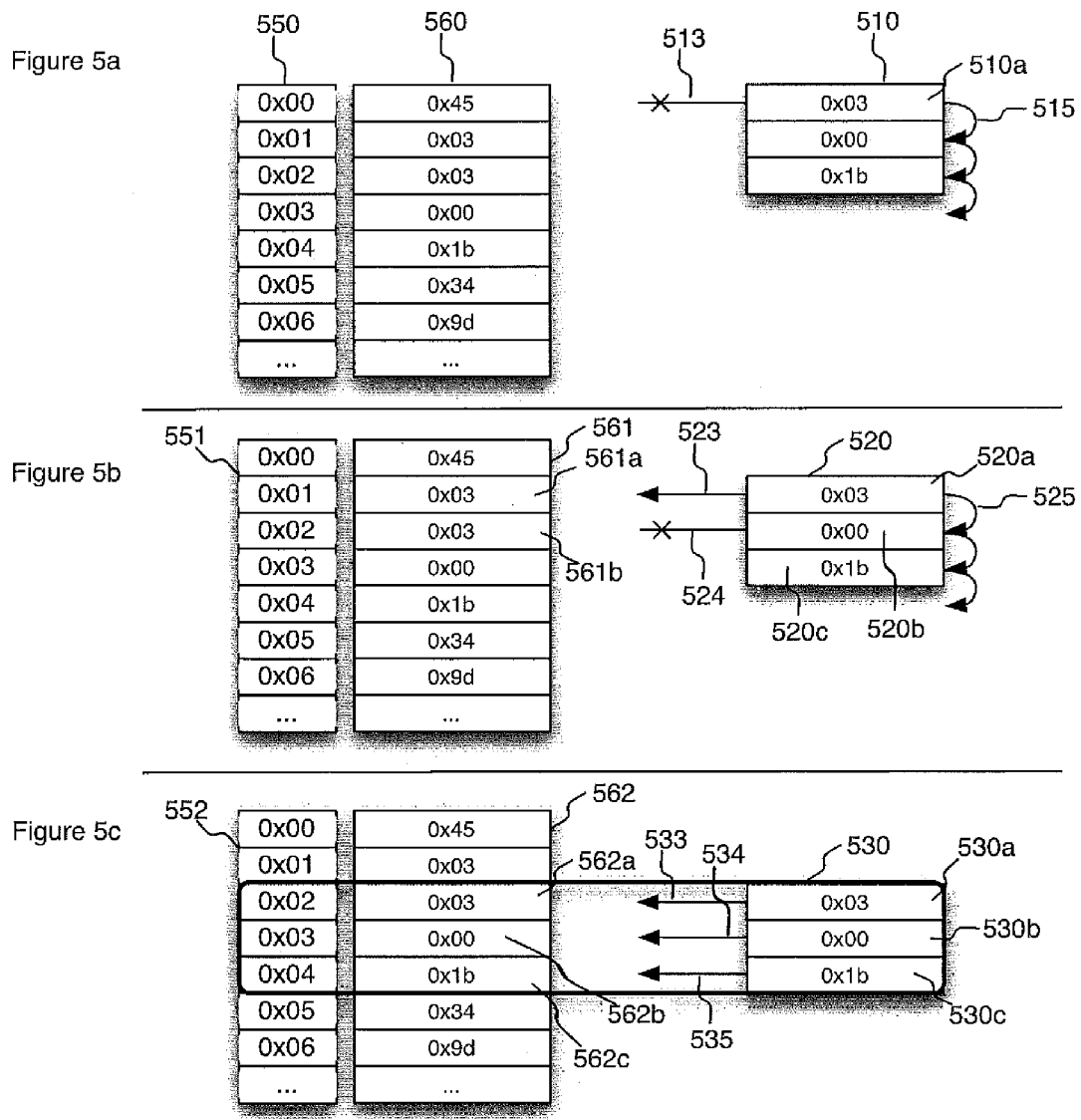

COMPUTER FORENSIC SYSTEM

BACKGROUND

Current anti-virus (or the more general, "anti-malware") software systems are fighting a battle with malicious-intent software (i.e. "malware") that has previously been largely unwinnable. The current systems focus on inspecting and alerting upon known (or weakly deduced) methods that malware authors and developers are constantly tweaking. The capabilities of current anti-malware systems to dynamically change their inspection techniques (outside of simple signature updates) are limited once installed on a host computer system in the field. This limitation creates numerous false positives and false negatives. True run-time dynamic response to changing threats is not an advantage of current anti-malware software. These current anti-malware systems oftentimes function with only moderate success until they completely fail due to a disruptive technology that is introduced by the malware developers. Until this new disruptive technology is observed, reverse-engineered, and understood by the anti-malware developers, the anti-malware's triggers and subsequent counter-measures are bypassed.

Ultimately, anti-malware will continue to fail so long as it functions within the current paradigm. Two primary characteristics condemn anti-malware systems to failure. These characteristics are that it (1) operates in a known manner and (2) operates from within the same context as the malware. Anti-malware functions in a "known manner" because there are operating system "rules" that it must abide by in order to avoid interfering with healthy system operations, and in some cases, in order to be approved by the operating system's manufacturer. These rules do not have to be followed by malware and oftentimes, depending upon the malware's ultimate goal, are stretched to the functional limit. Anti-malware also operates from within the same context that the malware operates. The issue of context does not necessarily signal a horrible practice, it is arguable that this must occur at some level in the current paradigm. However, by combining that anti-malware toolsets operate in a largely known way, function with the same level of access and act upon the same objects and structures within the system, anti-malware has not been able to actively attack malware. This is because the anti-malware is trying to retain its integrity while attempting to discover malware characteristics.

A paradigm shift must take place in order to be able to detect and remove malware from a computer system. There must be a shift in the strategy of attacking malware from a different context by employing a dynamic system.

FIG. 10 is a simplified block diagram of a system 1000 including a target host computer system 1011 and an analysis host computer system 1012. In FIG. 10, the target host computer system 1011 includes a central processing unit (CPU) 1014, also known as a "processor." Central processing unit 1014 coacts with a non-volatile storage device, or hard disk drive (HDD), 1016 and with volatile memory 1018, sometimes known as Random Access Memory (RAM) or "physical memory," across the multiple logical and physical layers of the target host computer system 1011 in order to perform various processes, as known in the art. The processes may include those of an operating system, such as Microsoft Windows©, which are initially stored in HDD 1016, and loaded into RAM 1018 at startup or initialization. Other programs and processes stored on HDD 1016 may be initiated from time to time or at startup. These additional programs and their support files result in processes being loaded into RAM 1018. Central Processing Unit 1014 acts upon these programs' commands in order to facilitate interaction between the user (where applicable), desired target host computer system hardware (which includes the processor 1014, RAM 1018, HDD 1016, etc.), and the target host computer system operating system. The user may interact with target host computer system 1011 by way of a physical device connected to user interface 1023. The device attached to user interface 1023 may be a keyboard, mouse, voice command arrangement, or the like.

In addition to the processes associated with the operating system intentionally loaded into HDD 1016 of target host computer system 1011 of FIG. 10, and in addition to the various executable, ancillary, and data files, the volatile memory 1018 may contain one or more malware processes or paths of malicious code execution (such as injected or patched dynamic linked libraries (DLLs), functions, drivers, etc.). Various means by which malware can be introduced into computer systems are well-known, and include computer viruses, Trojan horses, rootkits, and the like. The modes of transmission may include any of the paths by which the target host computer system 1011 interacts with its environment, including network connections 1072 accessed by a network interface 1022, disk drives, and the like. However introduced, the malware processes and malicious code paths may become resident within volatile memory 1018 and be executed by the processor 1014. When resident only within RAM 1018, such malware can be countered by (a) "rebooting" the target host computer system 1011 to thereby halt power to the RAM 1018, which without power and under normal conditions will effectively clear the contents of RAM 1018 of any discernible execution paths, and (b) then re-loading the RAM 1018 with the benign or acceptable processes stored on HDD 1016.

Under some conditions, the malware processes may also become resident on HDD 1016 of target host computer system 1011. This by itself is not necessarily deleterious, as the malware may adversely affect the operation of the target host computer system 1011 only when it becomes resident in RAM 1018 where it can interact with the benign or acceptable processes. However, when the target host computer system 1011 is rebooted with malware resident on the HDD 1016, the malware is likely to be re-introduced into the RAM 1018. Under these conditions the malware can now persist on the target host computer system 1011 during periods when the RAM 1018 cannot maintain its state or the contents of its memory (e.g. when it loses power during events such a reboot or power cycle of the target host computer system 1011). In cases such as these, rebooting the target host computer system 1011 may not effectively deal with the malware infection. When malware is introduced into the volatile memory, it may become intermixed with or "infect" one or more of the benign, acceptable or, "good" processes.

Security programs, such as those provided by McAfee, Norton, Webroot, and others, are often used with computer systems to counter various types of malware, such as spyware and viruses. Such security programs are intended to monitor information introductions to the computer by many potential paths and to sequester information identified as malware, render it harmless, or at least to warn of the presence of malware.

It is well-known that the providers of security programs are at a disadvantage relative to the developers of malware. This disadvantage results from the difficulty of anticipating what new malware will arise, and the characteristics that might render the malware amenable to detection and countering. In effect, the malware protection available to the operator of a computer such as target host computer system 1011 of FIG. 10 "runs behind" the development of security countermeasures. Thus, there is always the possibility, if the target host computer system 1011 is made available for the introduction of information or data, that malware will be introduced. It is very desirable, considering the possibility that the security programs may be only partially effective, that the operator of the target host computer system 1011 of FIG. 10 allow only data from a trusted source to be introduced into the target host computer system 1011. While some anti-virus software might employ anomaly-based measures that the companies may claim will help detect "future" malware, these anomaly-based measures are simply rulesets which can be circumvented after careful study of the governing rules.

Notwithstanding the strict use of trusted information sources and faithful adherence to up-to-date security programs and practices, introduction of malware into computer systems is a fact of life. The introduction of malware can be highly deleterious, potentially allowing (a) the computer system to be taken over and used as part of a "botnet" (a network of malware components controlled from a command entity) for propagating malware or undesired communications (such as spam) to other computer systems, (b) revelation of sensitive personal data such as bank account numbers and passwords, and in the context of national security, loss or corruption of sensitive technical, strategic, or tactical information.

Malware, in order to perform its malevolent function when it infects a computer system, must be accessible by the CPU or similar processing unit located on the system—which typically means that it must be resident in RAM—at some point in its execution. Malware that takes up residence in RAM of a computer must have, by necessity, bypassed all of the identification steps mandated by the resident security program, or it must have been confirmed (even mistakenly) to run by the user of the computer system. The presence of malware may become obvious or be suspected due to untoward operation of the computer. The response is usually to run an anti-malware program in a "scan" mode in which all, or most, of the processes' address spaces in HDD and RAM are inspected for recognized patterns and/or behaviors. However, it may well be that the malware, having already escaped detection by the security program on its way to execution, may again escape detection during a scan or even ongoing examination by the security software. In some cases, malware, once executing, may attack the security software's ability to detect certain parts or capabilities of the malware. At this point there may be no remedy except to re-format the HDD 16 and re-load it with the acceptable or benign programs so as to be able to continue with its use.

Some malware may not make its presence known or suspected by refraining to adversely affect the appearance of normal operation. For example, a computer that has been acquired for a botnet may draw unwanted operator attention if the takeover gives overt indications, such as execution latency or catastrophic application or operating system failure. Thus, such malware attempts to hide its presence on the target host computer system. Since there is no overt indication of infection with malware, no countermeasures may be taken, and the infected target host computer system may continue to operate, apparently normally, except that it may "run" the benign programs and processes with increased, yet unnoticeable, latency, as some of its computing power is diverted to fulfilling its malicious tasks. Due to operating systems' behemoth size and inherent latency for non-malicious reasons, there often is little way for the operator to determine or notice any malware-attributable delay.

Increasing attention has lately been directed towards forensic examination of computer systems. United States patent application 2005/0204205, published Oct. 13, 2005 in the name of Ring et al. describes a method for finding malicious modules, processes, and system call patches in a computer system and restoring the system to an uncompromised state. In the method of the Ring publication, various analyses are performed, including system call table address correlation, module linked list address correlation, user space and kernel space process-view correlation, network port binding verification, and user and kernel space file-view correlation. These analyses are performed on each inspected host computer system and the comparisons are made with regards to a single host computer system. Ring's analyses state that "it senses anomalous operating system behavior when activity in the operating system deviates, that is fails to adhere to, a set of predetermined parameters or premises." Not all malicious software affects systems in ways detectable by Ring's analyses.

Current methods of detection by anti-virus and anti-malware entities are reaching a point of diminishing return, because the depth and breadth of inspection can only be so extensive before noticeable overhead is produced, resulting in usability and functionality issues that become unbearable for users.

Numerous methods can be used to analyze the physical memory of a target host computer system. Before analyzing the contents of the physical memory however, it must be captured, or acquired. There are two primary modes or times at which physical memory capture can occur, namely live and off-line. "Live" memory capture occurs on the target host computer system and runs in the context of that operating system. "Off-line" physical memory capture occurs when the target host computer system's physical memory is not in operation and the physical memory has been stored in a binary file (such as in the case of a paused VMWare image or a computer in a state of "hibernation"). This binary file is then moved from the target host computer system (e.g., target host computer system 1011 of FIG. 10) and is analyzed on another host computer system, such as analysis host computer system 1012 of FIG. 10. Access to "live" physical memory can be performed through introduction of physical hardware or through software-based methods, such as by employing Application Programming Interfaces (APIs), well-known in the art. The copying and transfer of the "off-line" physical memory binary file can be performed in several ways. The target host computer system way is through an application that uses Application Programming Interfaces (APIs) to access and copy the physical memory to a binary file. This binary file is simply an on-disk copy of what is stored in physical memory. In the binary file format, we can now treat it as any typical system file and copy, move, read, or edit the data. A second way is to obtain physical memory binary files that have been created by virtual machine technologies or by the target operating system, such as hibernation files. Moving the data from the target machine can be performed in numerous ways as well. Using any method, the data can be transferred, as by path 1073 of FIG. 10, from the target host computer system 1011 to the analysis host computer system 1012. Path 1073 can involve using human interaction and removable media (such as CDs, floppies, etc.), a direct link (such as a null modem), or a network connection such as 1072 in order to transfer the data to the analysis host computer system 1012.

Recent strategies for removing malware from memory have typically focused on removing injected data structures from linked lists or repatching binary code that has been changed by the malware. While these methods are sound, the areas that they typically address do not cover the full spectrum of malware-targeted methods. As malware detection becomes increasingly proficient, malware's methods of hiding itself from discovery improve. This improvement typically means diving deeper into the lower levels of the operating system or taking advantage of increasing levels of indirection. As described earlier, it is increasingly difficult to perform these inspections by anti-virus/-malware software during run-time execution of the applications due to the increased overhead operations cost. Improved apparatus and methods are desired for cleansing malware from computer systems.

SUMMARY

A method is disclosed for cleansing malicious data from a memory of a computer. In the method, attributes are extracted from a set of training data including benign, non-corrupted acceptable training data and/or malicious training data. Attribute vectors are formed from the attributes extracted from the training data. The attribute vectors formed from data of an unknown type contained in the memory are compared with the attribute vectors formed from the training data to determine which ones of the attribute vectors formed from the data contained in the memory are similar or dissimilar to the attribute vectors formed from the training data. The data of the unknown type is deemed malicious if its attribute vectors are similar to the attribute vectors of the malicious training data and/or if its attribute vectors are dissimilar to the attribute vectors of the benign, non-corrupted acceptable training data. The data of the unknown type deemed malicious is removed from the memory of the computer.

A system is further disclosed for cleansing malicious data from a memory of a computer. The system comprises one or more processors executing instructions for extracting attributes from a set of training data including benign, non-corrupted acceptable training data and/or malicious training data. The one or more processors execute further instructions for forming attribute vectors from the attributes extracted from the training data. The one or more processors execute further instructions for comparing attribute vectors formed from data of an unknown type contained in the memory to the attribute vectors formed from the training data to determine which ones of the attribute vectors formed from the data contained in the memory are similar or dissimilar to the attribute vectors formed from the training data, wherein the data of the unknown type is deemed malicious if its attribute vectors are similar to the attribute vectors of the malicious training data and wherein the data of the unknown type is deemed malicious if its attribute vectors are dissimilar to the attribute vectors of the benign, non-corrupted acceptable training data. The one or more processors execute additional instructions for removing from the memory of the computer the data of the unknown type deemed malicious.

BRIEF DESCRIPTION OF THE DRAWINGS

FIGS. 5A, 5B, and 5C together constitute a 3-part block diagram representing a linear search of physical memory.

DETAILED DESCRIPTION

Figure 1:
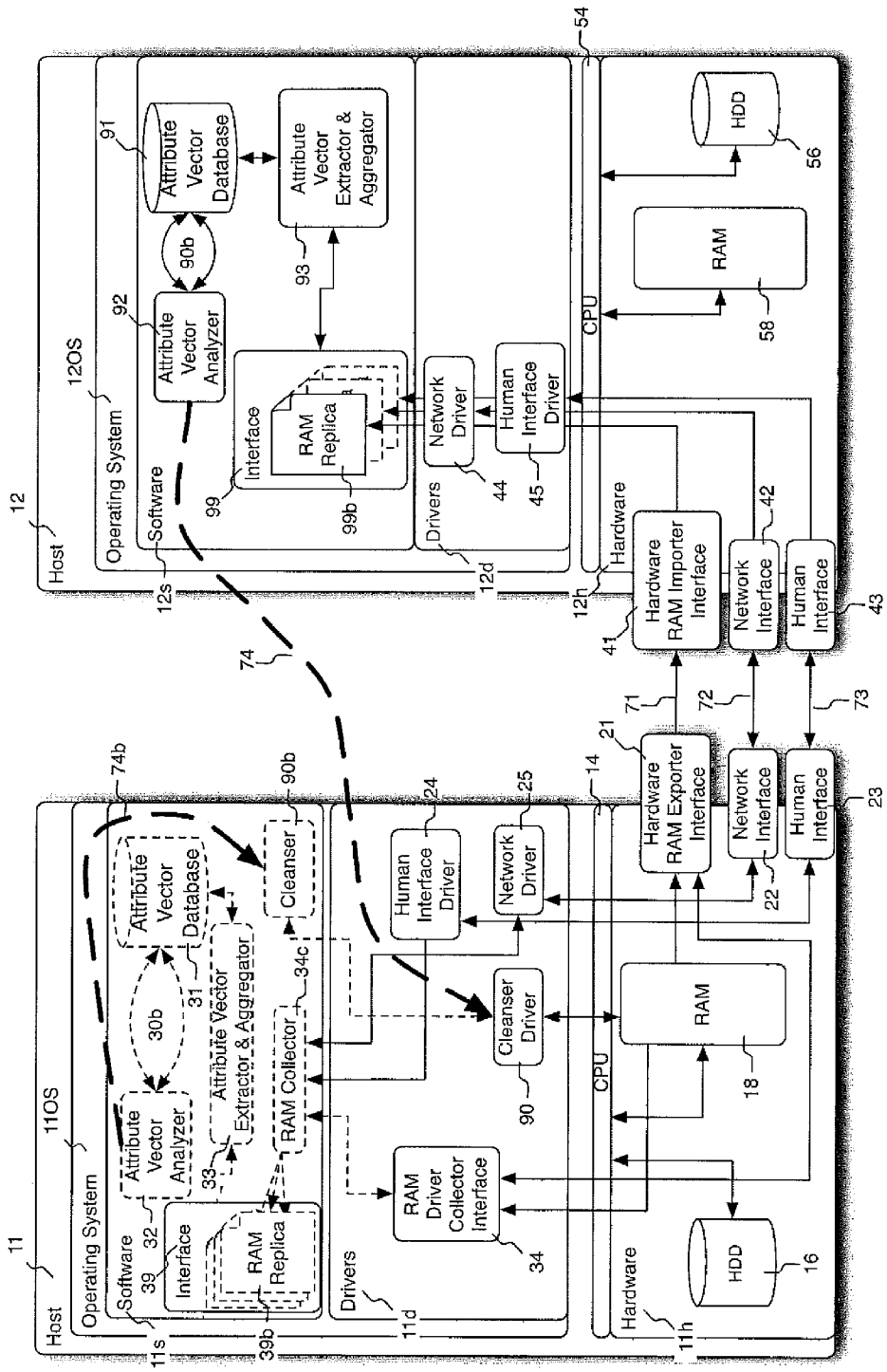
FIG. 1 is a block diagram of an exemplary embodiment of a system of the disclosure on which the method of the disclosure may be practiced. The system comprises a target and analysis host computer systems.

FIG. 1 is a block diagram of a system 10 including target and analysis host computer systems 11 and 12. Target host computer system 11 comprises hardware 11$h$ including a central processing unit (CPU) 14 interacting with a non-volatile storage device, or hard disk drive (HDD), 16 and a physical memory, i.e., volatile random-access memory (RAM) 18 (315 in FIG. 3). RAM 18 is in communication with hardware RAM exporter interface 21. The hardware 11$h$ coacts with various drivers of a set 11$d$ of drivers. An operating system 11OS includes a software set 11$s$ and a set 11$d$ of drivers. Set 11$d$ of drivers includes a human interface driver 24, a network driver 25, a RAM driver collector interface 34, and a cleanser driver 90. Human interface driver 24 and network driver 25 interface with RAM collector 34$c$, and also with target host computer system 11 human interface 23 and network interface 22. RAM driver collector interface 34 interfaces with RAM 18 and with RAM collector 34$c$. Software set 11$s$ associated with target host computer 11 as illustrated in FIG. 1 includes software such as RAM collector 34$c$, RAM replica 39$b$ contained within the (physical memory) interface 39, cleanser 90$b$, attribute vector analyzer 32, attribute vector extractor & aggregator 33, and attribute vector database 31.

Analysis host computer system 12 includes hardware 12$h$, and an operating system 12OS that includes a set 12$d$ of drivers and set 12S of software. Hardware 12$h$ includes a CPU 54 which interacts with HDD 56 and RAM 58. Driver set 12$d$ includes a network driver 44 and a human interface driver 45. Software set 12S includes an attribute vector analyzer 92 interacting with an attribute vector database 91, and also includes an attribute vector extractor and aggregator 93 and a RAM replica designated 94. A hardware RAM importer interface 41, a network interface 42, and a human interface 43 interact with human interface driver 45 and network driver 44 to produce a RAM replica 99$b$ contained (i.e. accessed through) (physical memory) interface 99.

One of ordinary skill in the art will appreciate that in single host system embodiments, the host computer system 11 will also be the analysis host computer system 12.

In FIG. 1, a data path 71 extends from hardware RAM exporter interface 21 to hardware RAM exporter interface 41, a data path 72 extends from network interface 22 to network interface 42, and a data path 73 extends from human interface 23 to human interface 43. On analysis host computer system 12, a data path 74 extends from the attribute vector analyzer 92 to the target host computer system's 11 cleanser driver 90 to transmit information relevant to the cleansing component. On the target host computer system 11, the attribute vector analyzer 32 communicates with the cleanser 90$b$ through a data path 74$b$ in order to transmit the cleansing information as needed.

A method for detecting and removing malicious software from the target host computer system 11 of FIG. 1 of the system 10 will now be described. There are several different operational paths that are contained within the system 10. Depending upon when in the system's 10 execution a decision-block is reached, either a user or the environment determines the subsequent steps. These operational paths (such as what is shown in FIGS. 2A and 2B, FIG. 3, and FIG. 4) allow for a wide range of paths through the analysis system, each path having its own benefits or supplementing the others.

Figure 2A:
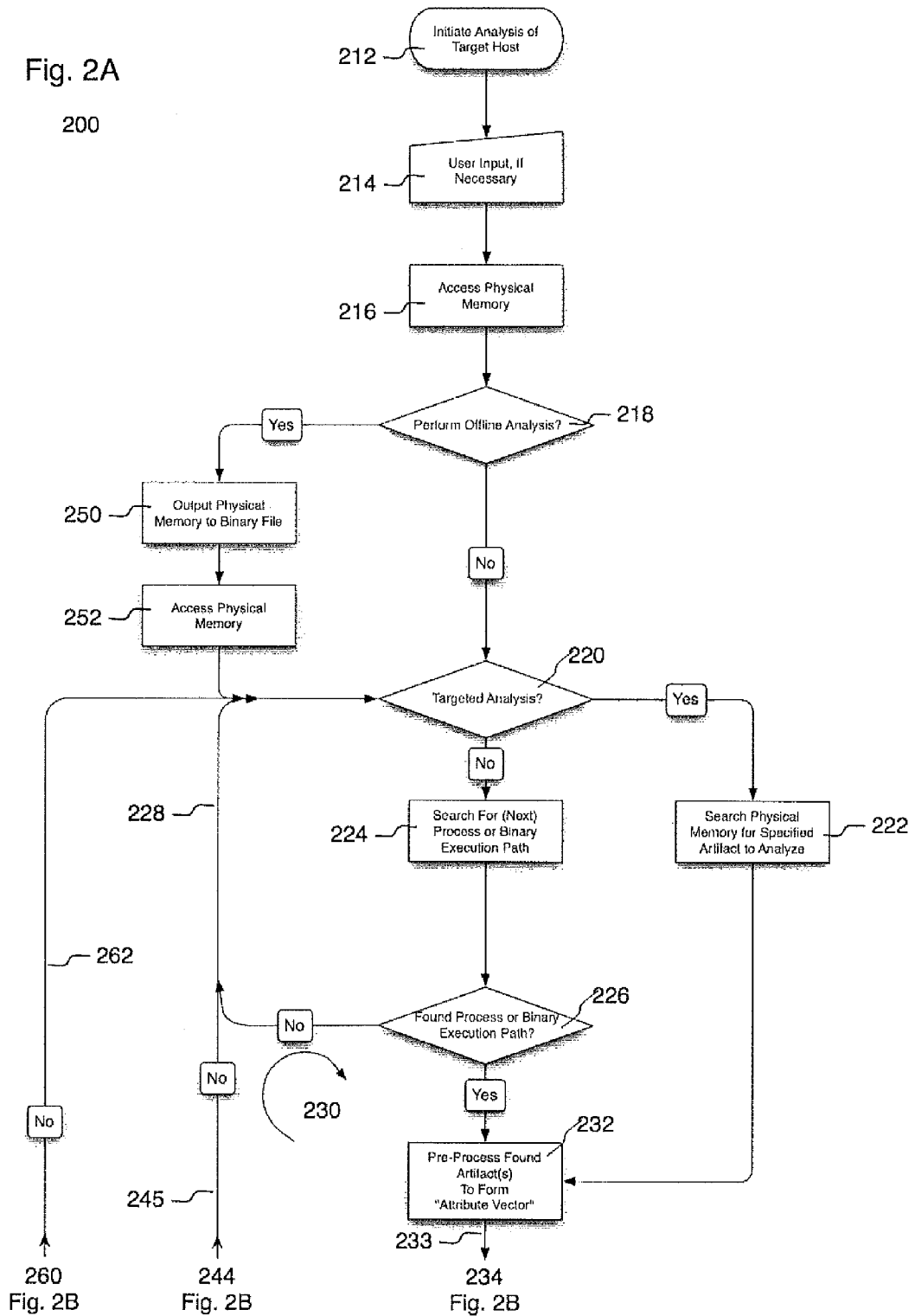
FIGS. 2A and 2B together are a flow chart representing a method for the extraction of physical memory to a raw file, pre-processing, analysis, and insertion into the database according to an aspect of the disclosure.
Figure 2B:
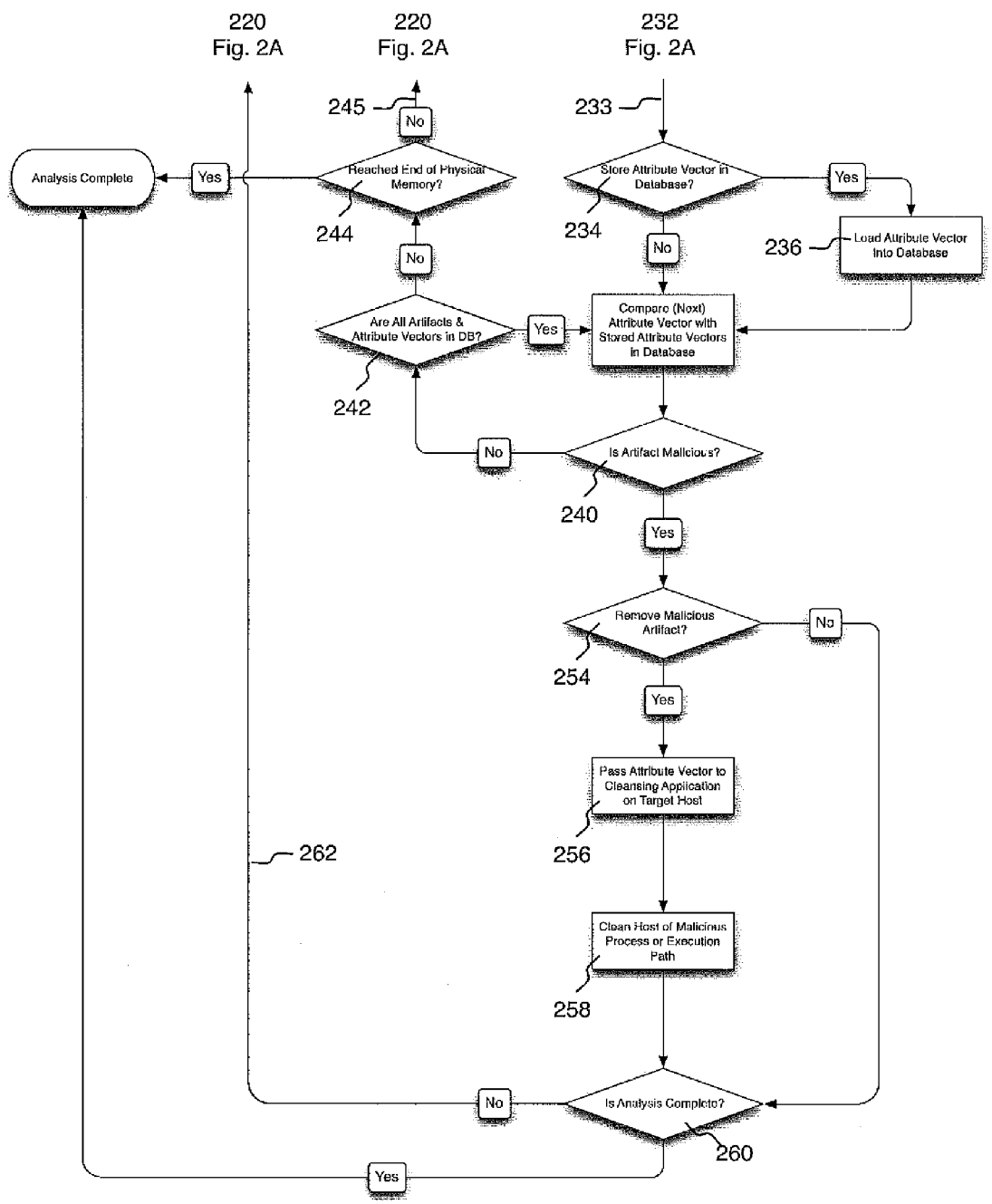

Referring still to FIG. 1 and also to the flow chart of FIGS. 2A and 2B, method 200 begins at an Initiate Analysis of Target Host block 212, and flows to a block 214, which represents applying user inputs, if necessary. Block 216 represents the accessing of the physical memory of the target host computer system 11. A decision block 218 selects offline or online processing. Online processing is reached by the NO output of decision block 218, and offline processing is reached by the YES output. If offline processing is selected, the method 200 leaves decision block 218 by the YES output, and flows through blocks 250 and 252 to arrive at a decision block 220. Block 250 represents the outputting of the physical memory to a binary file, and block 252 represents the accessing of the physical memory. The binary file representation of the physical memory is a bit-by-bit copy of the physical memory to a file. In the online processing path, the method 200 flows directly to decision block 220. Decision block 220 determines whether a target for the analysis has been specified. A target is any section of the target host computer system 11 that contributes to the execution of the malicious software and that once removed, will allow for the target host to continue functioning properly. A description of the generation of the target information or known-state attribute vectors will be described further on with reference to the flow chart of FIG. 9. If a target for the analysis has been specified, the method 200 of FIGS. 2A and 2B flows by way of the YES output to a block 222, which represents a search of the target host's 11 physical memory 18/315 (through the physical memory interface 39/99 (FIG. 1) and 310 (FIG. 3) for the specified artifact. The physical memory interface 39/99/310 presents the physical memory 18/315 (i.e., elements 316, 317, or 318 which make up the physical memory 315) as an interface to the anti-malware system so that the same general analytical process can be implemented whether performing an online or offline analysis of the targeted host's 11 physical memory 18/315. If no target for the analysis has been specified, the method 200 of FIGS. 2A and 2B flows by way of the NO output of decision block 220 to a block 224. Block 224 represents a search through the physical memory for the next process or binary execution path. This search iterates around a loop 230 including blocks 220, 224, and 226 so long as a process or binary execution path is not found, as decision block 226 routes the method 200 to its NO output and return logic path 228. If a target for the analysis has been specified in block 222, or if loop 230 finds a process or binary execution path, the method 200 is redirected by way of the YES output of decision block 226, and flows to a block 232. Block 232 represents pre-processing of the artifact found by block 222 or by the loop 230 to form an attribute vector. Attribute vectors are structures created during the pre-processing stage that describe processes, binary execution paths, their characteristics, as well as the relationships between these attributes, the operating system, and/or the user. To explain it in another way, an attribute vector is the n-dimensional vector representation of a process's or execution path's characteristics, or attributes, where n is the number of user-desired/-defined characteristics. When the attribute vector is pre-processed as represented by block 232, the method 200 flows to a decision block 234, which determines if the preprocessed attribute vector should be stored on or in the attribute vector database 31/91 (hereinafter, "the database"). If decision block 234 finds that the attribute vector should be stored, the method 200 leaves block 234 by the YES output and flows to a block 236, representing the storage of the attribute vector in database 31/91. Whether from block 236, or if the pre-processed attribute vector is not to be stored, from the NO output of decision block 234, the method 200 flows to a block 238. Block 238 represents the comparison of the next attribute vector with stored attribute vectors from the database. From block 238, the method 200 flows to a decision block 240. Block 240 accepts the comparison of the current artifact in question with the stored attribute vector, and decides if the artifact in question is malicious. If the artifact is not malicious as determined by decision block 240, the method 200 flows by the NO output to a further decision block 242. Decision block 242 determines if all of the artifacts and the attribute vectors are present within the database. If the artifacts and attribute vectors are located within the attribute vector database 31/91, the method 200 leaves decision block 242 by the YES path, and returns to block 238 to compare the next artifact with an attribute vector. Thus, blocks 238, 240, and 242 together define a loop 243 which operates so long as the artifact is not malicious and the elements is within the database. In the event that, for any artifact or attribute vector, the values are not expressed in the attribute vector database 31/91, the method 200 of FIGS. 2A and 2B leaves decision block 242 by the NO output, and arrives at a further decision block 244. Decision block 244 determines if the end of the physical memory has been reached, and if not, the method 200 leaves decision block 244 by the NO output, and returns by a logic path including portions 245 and 228 to decision block 220, to start another iteration.

In the event that decision block 240 of FIGS. 2A and 2B determines that the artifact is malicious, the method 200 flows by the YES output to a decision block 254, which determines whether the malicious artifact is to be removed. If removal is indicated, the method 200 flows by the YES output of block 254 to a block 256, which represents the passing of the malicious attribute vector to the cleansing application on the target host (11 of FIG. 1). From block 256, method 200 flows to a block 258; this represents the use of the cleansing software to clean the host of the malicious process or execution path. From block 258, or from the NO output of decision block 254, method 200 of FIGS. 2A and 2B flows to a decision block 260. Decision block 260 determines if the analysis is complete. If the analysis is not complete, the method 200 leaves decision block 260 by the NO output, and flows by a path 262 back to decision block 218 to begin another iteration. If the analysis is complete, the method 200 leaves decision block 260 by the YES output, and flows to an END or Analysis Complete block 264.

The system according to the disclosure employs several distinct software components (in addition to software sets 11s and 12s described earlier) to aid in the execution. These software components automate the collection, pre-processing, and analytic steps through the system and thus, if a step is not included in an operational path, the software component is not needed. These software components perform the described functions of the method, so are not separately described. The software components are responsible for obtaining access to the targeted physical memory (or a replica of the targeted physical memory), pre-processing, as well as analyzing (which includes processing, correlating, and classifying), transporting, and storing it.

Figure 9:
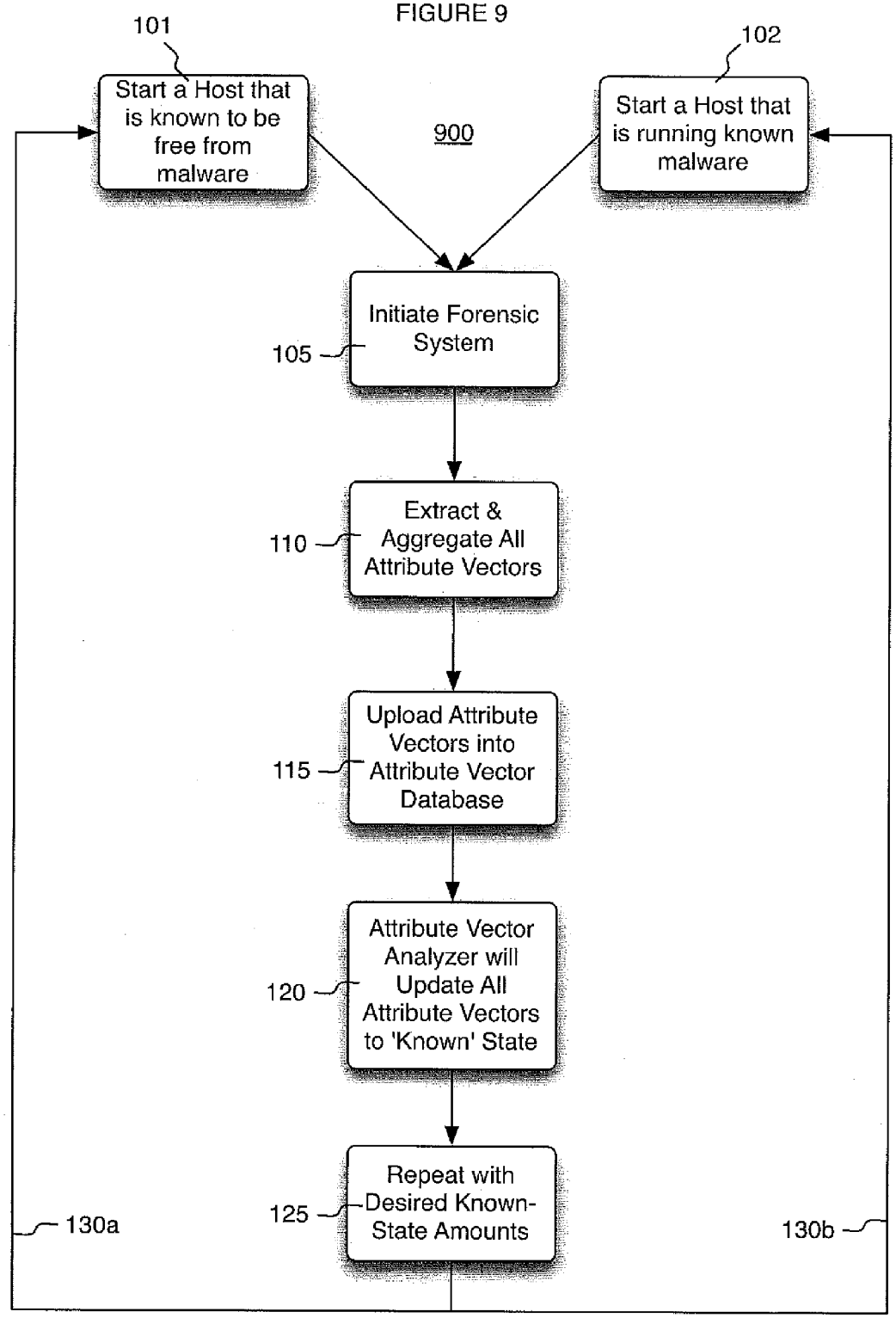
FIG. 9 is a simplified logic or command flow chart or diagram illustrating the priming of the attribute vector database with known-state attribute vectors.
Figure 10:
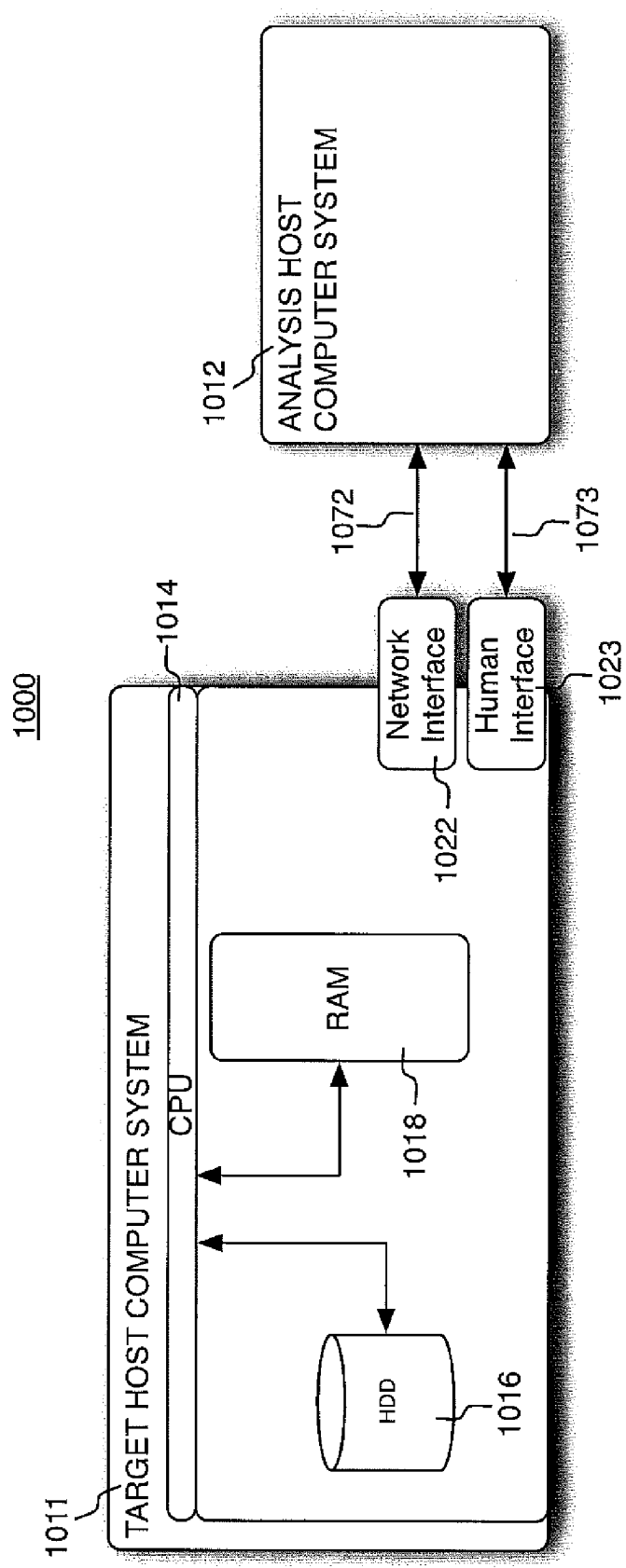
FIG. 10 is a block diagram of a conventional system including target and analysis host computer systems.

FIG. 9 illustrates a method 900 for generating the known-state attribute vectors for priming the attribute vector database. In present disclosure, the multiple dimensions are represented by attributes contained within an attribute vector. Referring now to FIG. 9, the method 900 begins at a block 101, which represents the starting of the target host computer system 11 of system 10 in FIG. 1 when it is known to be free of malware. From block 101, the method 900 flows to a block 105, which represents the initiation of the forensic/anti-malware system of the disclosure, and block 110 represents the extraction and mathematical aggregation of all, or at least as many as can be conveniently handled, of the known-state attribute vectors. One such method of mathematical aggregation and analysis would be clustering. Clustering methods are well known in the data mining art and allow one to derive multi-dimensional closeness calculations. The specific clustering method implemented in the present disclosure depends largely upon the user. For example and not limitation, if the user does not have any "known-state" files, and only wanted two different sets of files (i.e. the user was only using two centroids to calculate which files were most like one of two clusters), the user could implement either k-means or fuzzy c-means clustering with two initial centroids. The attribute vectors would represent the n-degree vectors ('n' representing the number of attributes being used to represent the data point in space) which represent the individual points used in the mechanism of clustering. Then, based upon whether the user has "known data points" (as the user would have if they went through the initial setup process with hosts of known states), the user would select the type of clustering method to use. Generally, the user determines which method of clustering is best to use because several of the methods do not always yield consistent results, or those which offer consistent results may provide different results given the amount of clusters that the user requires. Block 115 in FIG. 9 represents the uploading of the aggregated attribute vectors into the attribute vector database 31/91. Block 120 represents the updating of all known-state attribute vectors in the attribute vector database 31/91 so that future executions of the system 10 will have baseline (malware and benign software) attribute vectors from which to make malware/benign software decisions. From block 120, the method 900 of FIG. 9 flows to a block 125, which represents repetition of additional host computer systems (in distributed computer system applications which include multiple host computers that access an attribute vector database to make analytical decisions), including but not limited to the analysis host computer system 12 of FIG. 1, with known-state applications so as to build a larger known-state base of malicious and benign applications. An alternative starting point for the flow of method 900 of FIG. 9 is block 102. Block 102 represents starting the target host computer 11 when it is running known malware, so that the various known-state attribute vectors, which will be subsequently extracted, aggregated, and loaded into the attribute vector database 31/91, include characteristics of malware.

Figure 3:
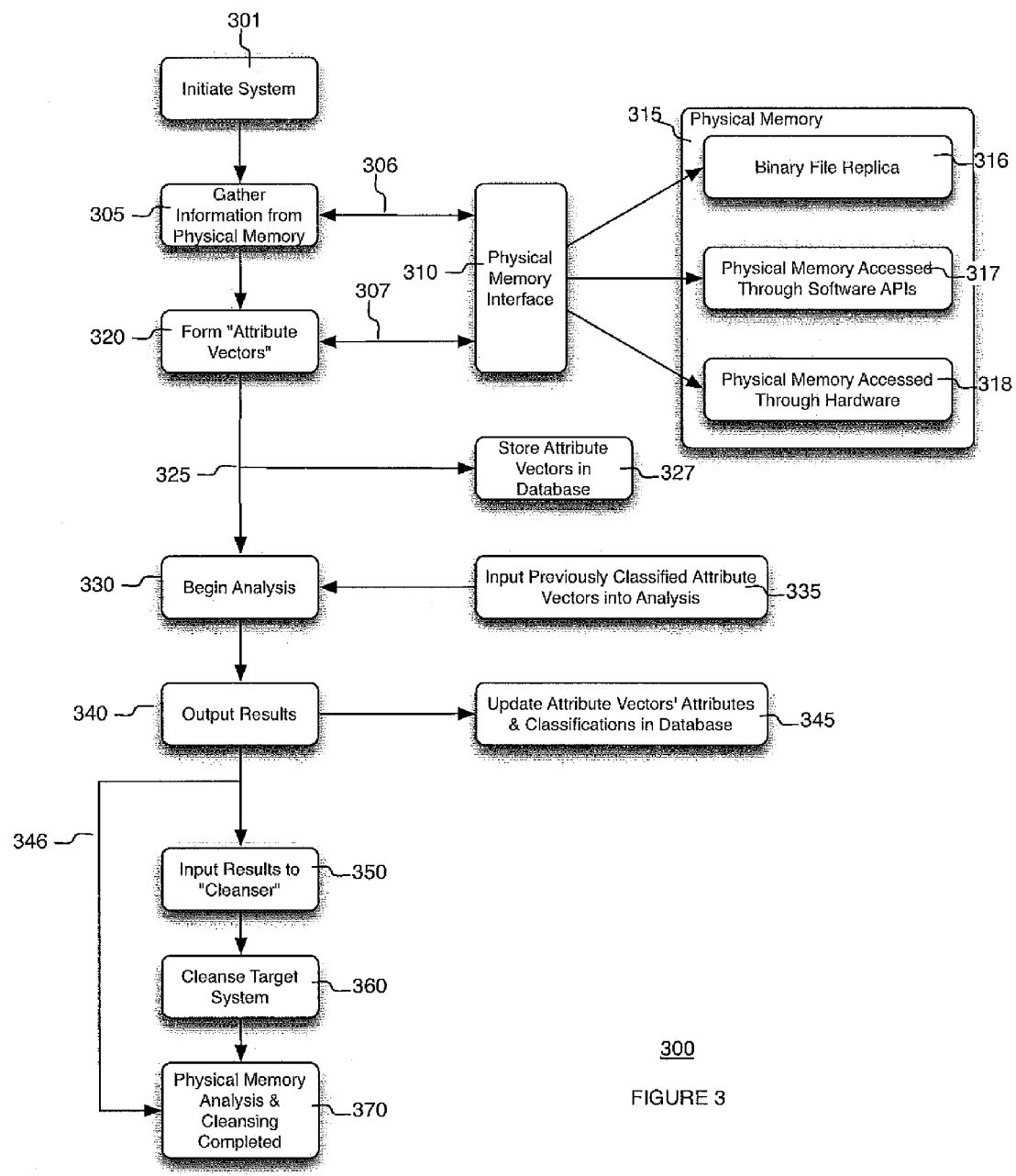
FIG. 3 is a flow chart illustrating various steps according to aspects of the disclosure.

FIG. 3 is a simplified flow diagram illustrating aspects of the disclosure. In FIG. 3, the method 300 begins at the Initiate System block 301, and flows to a block 305, representing the accessing or gathering of information from physical memory 18 of the target host computer system 11 of FIG. 1 (depicted as physical memory 315 in FIG. 3). This action involves making connections, illustrated as 306, with the logical physical memory interface 39/99/310. The physical memory interface 39/99/310 accesses physical memory 315, as by accessing one (or more) of a binary file replica 316, a physical memory accessed through software applications 11s/12s (FIG. 1), illustrated as a block 317, and physical memory accessed through hardware 11h/12h (FIG. 1), designated as a block 318. Once the information is gathered from physical memory, physical memory interface 39/99/310 makes the information available (path 307) to a block 320, representing the formation or generation of attribute vectors representing the various processes and execution paths. When the attribute vectors are formed, the method 300 of FIG. 3 proceeds to decision point 325, where, if desired by the user through input into the system 23/43, allows the flow to reach a block 327 representing storage of the attribute vectors in the attribute vector database 31/91 (FIG. 1). In any case, the method 300 of FIG. 3 proceeds to a block 330, representing the beginning of the unknown data type analysis to determine whether data is malicious. From block 330, the method 300 of FIG. 3 proceeds to a block 340, which represents the outputting of the results of the analysis of block 330. The output of block 340 to block 345 represents the storage of the analysis result in the attribute vector database 31/91/345, in which event the flow of FIG. 3 may proceed by way of a path 346 to an end-representing block 370. Additionally, the results of the analysis from 340 may also be forwarded via data path 74/74b (FIG. 1) to the cleanser 90/90b (FIG. 1), and block 350 represents the inputting of the analysis results to the cleanser 90/90b. The two cleansers 90 and 90b are provided because, depending upon the type of malware, driver-level access might not be required, so in order to avoid acting at a level greater than is required by the targeted malware (which could cause unwanted effects on the OS 11), the cleansing process can actually act on a user-level in order to rid the system of the offending malware. Driver-level (also known in the art as system-level or ring 0) access is the preferred level of access knowing that, barring a hypervisor, at system-level access you are running at the most privileged state on the system. Block 360 represents cleansing of the target host computer system 11 of FIG. 1, and block 370 represents completion of the analysis and cleansing of the physical memory 18/315.

Figure 4:
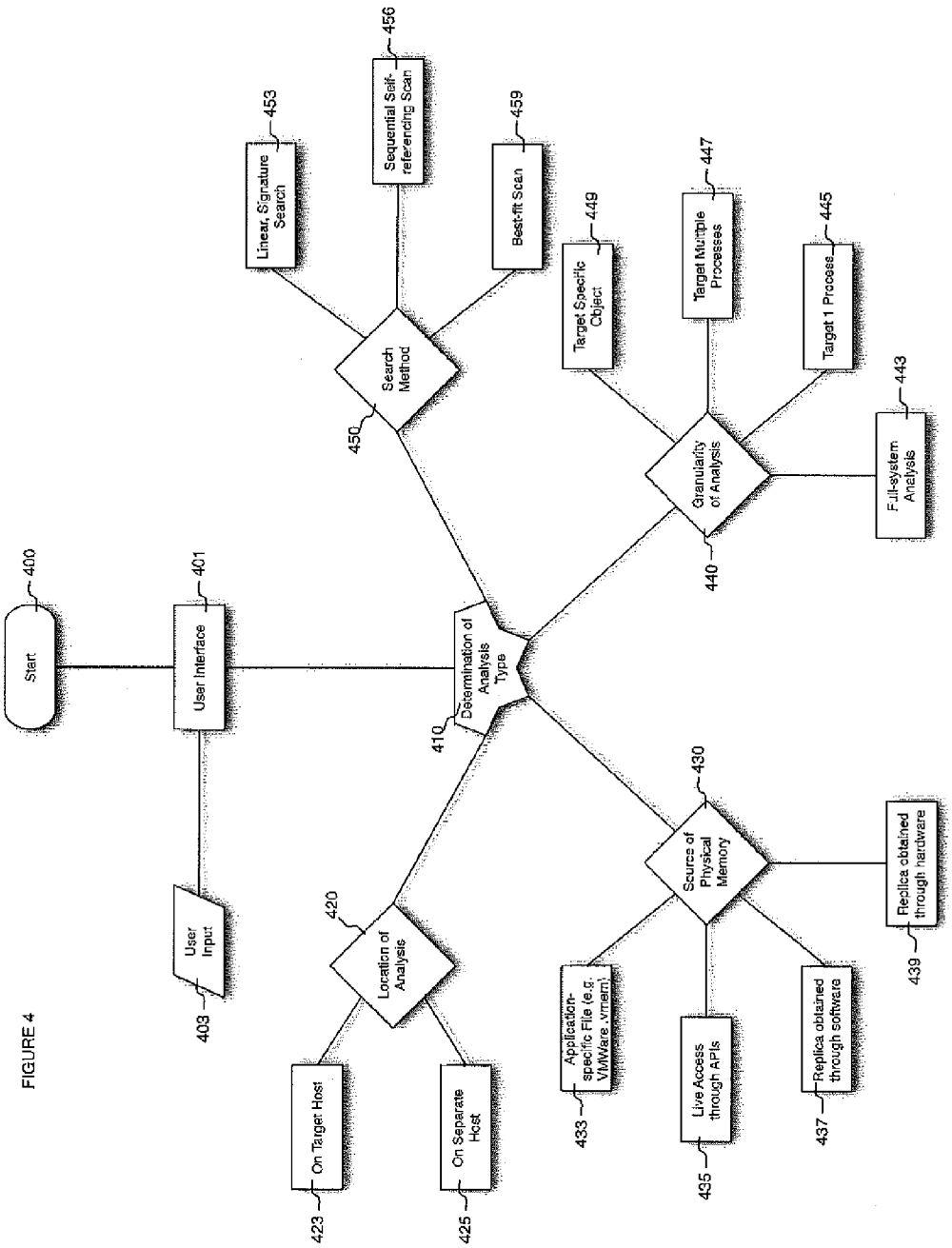
FIG. 4 is a flow chart representing a 4-part decision switch affected by user input to the system.

FIG. 4 is a simplified diagram illustrating various options which may be selected when initiating an analysis. In FIG. 4, the options begin with a START block 400, from which a single path leads to a block 401, representing local or user input through either manual input (via human interface 23) or software 11s input. From block 401, the options flow to a decision block 410, which allows selection of the location of the analysis (block 420) on either target host computer system 11 or analysis host computer system 12, source of the captured physical memory 18, search method (block 450), and the granularity of the analysis (block 440). Location-of-analysis block 430 can select "on target host" block 423 (target host computer system 11 in FIG. 1) or "on separate host" block 425 (analysis host computer system 12 in FIG. 1). Source-of-captured-physical-memory 18/315 block 430 can access block 433, representing an application-specific file, such as VMWare Workstation's ".vmem" physical memory representation file 316 (FIG. 3), block 435, representing live access through Application Programming Interfaces (APIs) 317(FIG. 3), block 437, representing obtainance of the replica by way of software 317, and block 439, the obtainance of the replica by way of hardware 318(FIG. 3). Search method block 450 can access a block 453, representing a linear signature search, a block 456, representing a sequential, self-referencing scan, and a block 459, representing a best-fit scan. Granularity block 440 can access a block 443, representing a full-system analysis, a block 445, representing a single-target process, a block 447, representing a multiple-target process, and a block 449, representing the targeting of a specific object. The analysis and search methods occur within the attribute vector database 31, the attribute vector analyzer 32 the attribute vector extractor and aggregator 33, the RAM driver collector interface 34 and the RAM collector 34c (in the case of a live analysis) if the analysis is performed on-host as in target host computer system 11. Additionally, the analysis and search methods occur within the attribute vector database 91, the attribute vector analyzer 92, and the attribute vector extractor and aggregator 93 on analysis host computer system 12 if the analysis is performed off-host.

Aspects of the disclosure provide novel approaches to malware detection and removal in order to address the great litany of threats seen from the large variety of malware. The analytical method presents a single, all-encompassing methodology that provides the analyst with one method to address multiple threats of both known and unknown malware.

Upon initiation of the analysis of physical memory 18/315, the user provides input into the system 10 of FIG. 1 (typically through an attached device, such as a keyboard attached to human interface 23, as suggested by block 301 of FIG. 3. This input describes the type of analysis to be performed, selected from among the various types set forth in FIG. 4. The user-entered information determines whether the analysis will be performed on the target host computer system 11 or on a separate host computer system 12 (as shown in the decision block 420 of FIG. 4), how the physical memory will be accessed (decision block 430 of FIG. 4), if the analysis is directed at a specific process or is a full-host analysis (decision block 440 of FIG. 4) and the number of iterations which will be performed, and the searching algorithm to be employed (decision block 450 of FIG. 4). Depending upon the type of analysis being performed (e.g. on-target host versus off-target host), not all of these decisions would need to be made initially.

Analysis can be performed online (live) as in blocks 317 or 318 of FIG. 3 or offline as in block 316 of FIG. 3, however, the physical memory interface 39/99/310 is meant as an abstraction in order to reduce the complexity of speaking to each method and allow for general access of the physical memory whether online or offline. In online analysis, the access of the physical memory is done in real-time on the target host computer system 11 targeting the in-use physical memory of the running target host computer system 11. While this provides for a current, yet dynamic, view of physical memory, it also has the potential to suffer from the fact that, if done through software and system Application Programming Interfaces (APIs), it will be executing in the context of the target host computer system 11. By executing the analysis within the context of the target host computer system 11, the system 10 could potentially be vulnerable to denial or deception attacks. In order to avoid the potential of compromised execution, the second type of analysis that can be employed is offline analysis. This type of analysis is performed when the physical memory is copied to, or presented in the form of, a file representation of physical memory. This file can either be moved from the target host computer system 11 to the analysis host computer system 12 or left residing on the target host computer system 11. Even though the physical memory binary file is being processed on the target host computer system 11, it is still considered off-line since the in-use, running physical memory is not being examined.

After the initial decisions have been made (FIG. 4), access to the physical memory must be obtained (as described in conjunction with FIG. 3). This access can occur in any of multiple ways, all of which are known or common in the art. Logically, the physical memory is accessed through an interface 39/99/310 so that accessing and analysis of the physical memory will be performed in the same manner whether the analysis is being performed live or offline. Several examples of acquiring a access to the physical memory are as following: employing software APIs to create a replica file of the physical memory (316, 437), using hardware tools or modifications to construct a replica file of physical memory (318, 439), exploiting support files that are part of other applications (such as VMWare Workstation's ".vmem" files—file representations of physical memory) (316, 433), or using continuous live access to physical memory through APIs [317, 435].

The next stage in a method of the forensic system is performed either on the target host computer system 11 that is the target of the analysis or on the analysis host computer system 12, which is dedicated to analysis. Either way, the next decision that must be made based upon whether the user decides to perform a live or offline analysis, is the selection of the desired granularity of the analysis. The granularity determines whether the analysis will be directed at a specific process or performed against the target host as a whole. If targeted at a specific process, the user may enter the process's name, process ID (or PID), or other distinguishable process characteristic. For the targeted search, the search algorithms implemented by either the RAM collector 34c or attribute vector extractor and aggregator (33 if on-host and 93 if off-host) will search through the physical memory until it finds the desired process and then performs an in-depth analysis of the targeted process's related structures in order to gain a complete process-level view for later processing. For the whole-host analysis, the search algorithms implemented by either the RAM collector 34c or attribute vector extractor and aggregator (33 if on-host and 93 if off-host) searches through the physical memory in order to build data structures that represent processes, execution paths, drivers, kernel objects, etc. These structures are used in the later analysis to relate different objects within the physical memory.

Any one of a number of methods can be employed in searching through the physical memory for processes or structures as is performed in the Attribute Vector Extractor & Aggregator and the Attribute Vector Analyzer. However, there are four specific search methods that are of interest. The first method, illustrated in conjunction with FIGS. 5A, 5B, and 5C, is a linear search using common signatures from the variables that reside within the sought-after structures. FIG. 5A details the address range 550 starting from 0x00 and increasing as one moves down the left-most or the first column 550 of the chart, contents of memory in the second column 560, and a sample or representative signature in column 510. The first byte (0x03) of the signature, represented by 510a, is matched against the first byte (0x45) 560a of the memory contents, and is found not to match, as suggested by an x on line 513. The tool in response to the lack of match increases the address range being inspected by a certain amount (in this example by one byte), represented in FIG. 5A as 515. This brings us to a state represented by, or we observe, FIG. 5B. In FIG. 5B, 551 is the column of the address range, column 561 is a column which represents or displays the contents of memory at the location of the address, and 520 represents the signature. The first byte 520a of the signature (value 0x03) is compared with the value (0x03) of the contents of the memory at location 561a, and a positive match is made, represented by an arrow and the lack of an x on line 523. Then, the second byte of the signature, at location 520b, and having value 0x00, is compared with the second byte of the memory contents at location 561b of column 561 (value 0x03), but a positive match is not made (x on line 524). There is no need to inspect the third byte 520c of the signature at this point due to the fact that the second byte of the signature at location 520b did not match the second byte 561b of the memory contents. The analyzed range is increased again, as suggested by path 525. FIG. 5C displays the resulting address range as the left-most column 552, memory contents as the second column 562, and the signature as a separate column 530. In FIG. 5c, first byte 530a of the signature (value 0x03) matches the first byte of the memory contents at location 562a (value 0x03), with the match result appearing as line 533 with an arrow and without an x. Similarly, the second byte 530b of the signature (value 0x00) matches the contents of the second byte 562b of the memory (value 0x00), as indicated by arrow line 534 without an x. The third byte 530c of the signature (value 0x1b) matches the value (0x1b) of the third byte 562c of the memory, as suggested by arrow line 535 without an x. This means that there is reason to believe that the desired structure has been found in the memory. The structure can now be pre-analyzed and formed into an attribute vector. While this method is extremely thorough, it can be tricked by malicious methods that change the signatures inside of the operating system. These attempts to disguise malicious signatures can be thwarted by performing searches using additional ones of the methods listed here in order to validate and verify the results of the first search method.

Figure 6A:
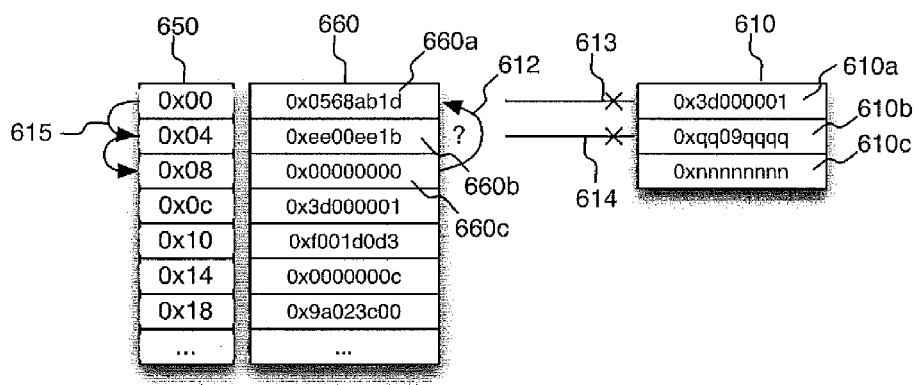
FIGS. 6A and 6B together constitute a 2-part block diagram illustrating the self-referencing search method.
Figure 6B:
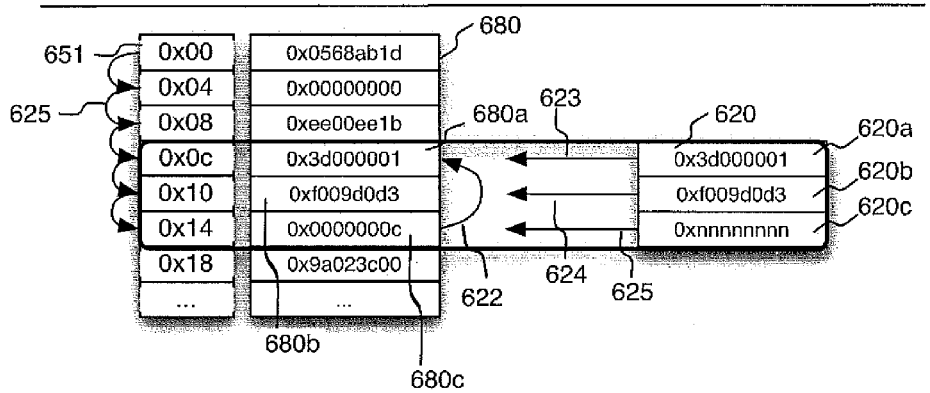

The second search method is termed a sequential, self-referencing scan and can be understood in conjunction with FIGS. 6A and 6B. Several structures within several of the more often used kernels (such as Windows) have variables within them that self-reference the structure. In other words, a variable within a certain structure contains that same structure's address in memory. A sequential scan is performed across the physical memory address space and each byte sequence is checked to see if it translates to a similar address. Then, a template of the desired, possible structure(s) is laid upon the referenced range. FIGS. 6A and 6B contain representations of memory address ranges in the form of columns 650 and 670, respectively, representations of the contents of memory in the form of associated columns 660 and 680, respectively, and examples of low-level structures in the form of columns 610 and 620], respectively. The value of the first byte 610a of the signature of column 610 of FIG. 6A is 0x3d000001, the value of the second byte 610b of the signature 610 is 0xqq09qqqq, and the value of the third byte 610c of the signature 610 is 0xnnnnnnnn. The 'q's and 'n's within columns 610 and 620 are placeholders for unknown values at the time of the comparison. These values are filled in once other signatures (such as 610a) or characteristics (such as the self-referencing property of 610c) is or are fulfilled. In FIG. 6A, the value of third byte 610c of the signature 610 may be known to be a self-referencing structure. Therefore, the memory range is searched, as suggested by path 615 until the search comes upon a possibly viable or possibly matching link, such as 660c, having a value 0x00000000. The value 0xnnnnnnnn of link 610c is checked to validate that the value held in 610c would properly "self-reference" the beginning of the desired structure (610), as suggested by path 612. It is found that the value 0x3d000001 of the first byte 610a of structure 610 does not match (x in line 613) with the desired signature, value 0x0568ab1d, stored in the address represented by 660a. Similarly, the value '0x09' of 0xqq09qqqq of the second byte in 610b of the signature 610 does not match the value '0x00' of 0xee00ee1b in the second byte of the memory location 660b, as evidenced by the x in output line 614.

In FIG. 6B, the memory address column is 670, the corresponding value column is designated 680, and the signature column is 620. In FIG. 6B, the searched range (represented in FIG. 6A by paths 615) is illustrated by path 625 as having been increased several iterations, and in that additional searched range a second possible self-referencing link 680c is found, having a value 0x0000000c that might be a viable match with the value 0xnnnnnnnn of the third byte 620c of the signature 620. The structure 620 is moved to match the address range and then comparisons are made. The value 0x3d000001 of the first byte 620a of the signature matches the value 0x03d000001 of the byte occupying location 680a, as suggested by arrow line 623 without an x. Additionally, the value 0xf009d0d3 of the second byte 620b of the signature 620 matches the value 0xf009d0d3 at location 680b. Therefore, the values at memory locations 680b and 680c appear to be correct values, meaning that, with a high probability, the data stored in the memory address range represented by locations 680a, 680b, and 680c is the sought-after structure. If the result is a reasonably accurate representation of a structure with self-referencing variables, then it is determined to be a match and is recorded as an accurate structure. Then, in the same way in which the second part of the signature-based sequential scan is performed, links are followed from within these "verified" structures in order to "build out" a fair representation of the operating system's structure hierarchy.

Figure 7:
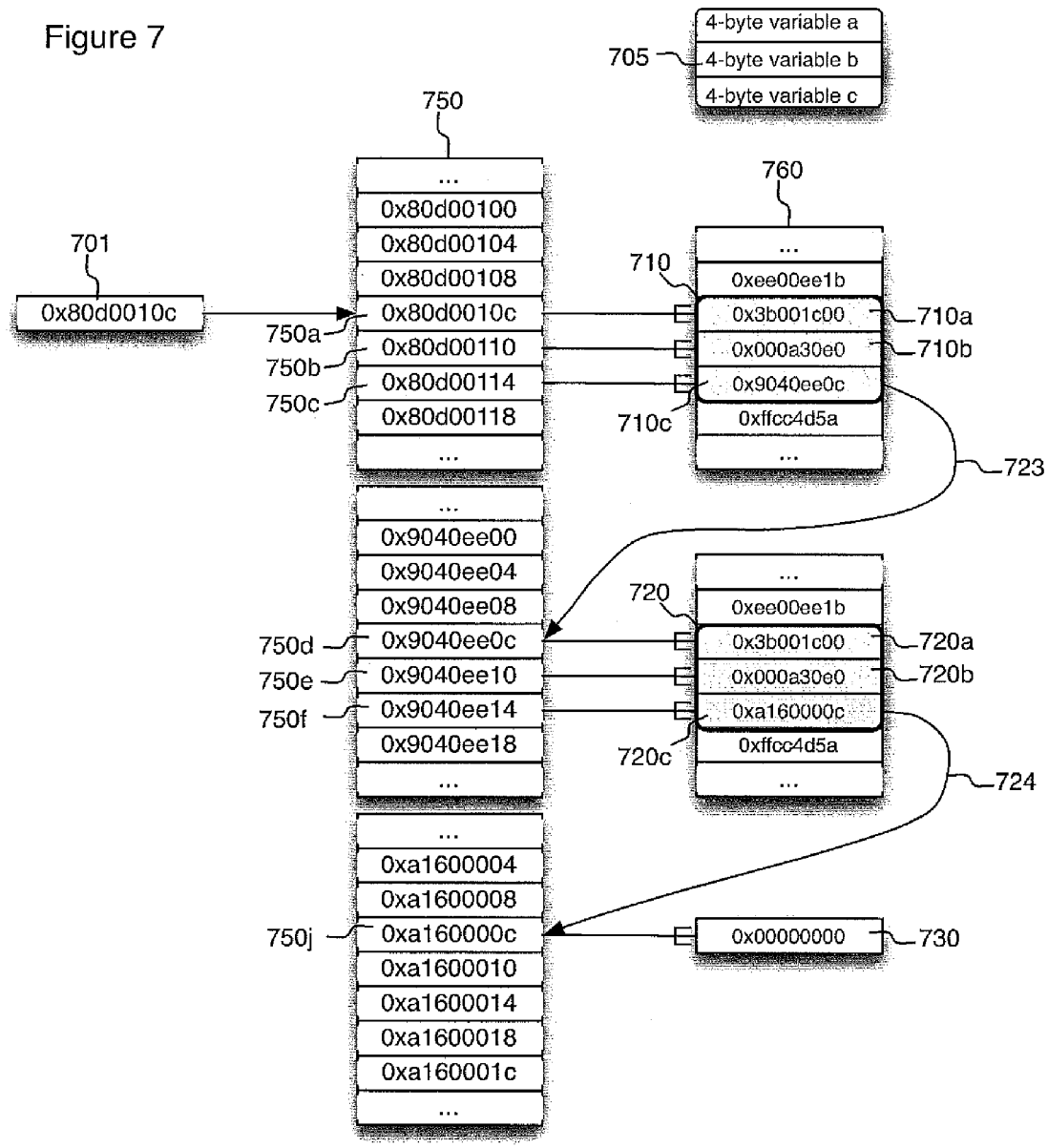
FIG. 7 is a block diagram representing the link traversal search method.

The third search process described herein is the best-fit method. The best-fit method, as with the self-referencing system, relies upon candidate structures being laid across byte sequences and a subsequent confidence analysis of the variable values in order to determine the presence or absence of a structure. However, the best-fit method relies upon the fact that within the physical memory of properly functioning operating systems, structures are often relegated to certain ranges that are related to their functionality within, and support of, the operating system. Therefore, the search set is significantly narrowed due to the fact that certain structures should only be found in certain ranges. FIG. 7 displays an implementation of the best-fit method used to determine whether or not a given memory address range is likely to be or bear the desired structure. In FIG. 7, 701 represents a random address in memory, column 750 represents a run of address ranges, and column 760 displays certain address ranges' values. Random address 701 represents a known or chosen starting address value. Some operating systems have well-known static addresses for certain structures that make this best-fit method especially useful.

FIG. 7 demonstrates the validation of a structure 710 pointed to by the contents of 701. The structure 710 needs to follow the pattern and "rulesets" set forth by example structure 705. The validity of structure 710 (based upon 705) is dependant upon it being comprised of a structure that contains two 4-byte variables 710a and 710b and then a linked-list (well known in the art) variable 710c as the last member of the structure (see also, structure 705). Memory addresses 750a-c contain structure 710 comprising variables 710a-c. Variable 710c is the variable that is supposed to be a linked-list pointing to another identical structure. When the structure 710 is overlaid on top of the address range starting at variable 750a, the subsequent values of the variables 710a-c were congruent with a valid structure. The validity of the structure's 710c value can be further validated by following the value of the address 710c and represented by pointer 723 and fitting a structure 720 over the subsequent memory addresses 750d-f. Variables 720a and 720b appear to be within valid or expected values for those two variables within the variable range as defined by structure 705. Once more, both structures 720 and 710 are further validated by following the variable's 720c memory address value represented by pointer 724 to the next address 750j, where the value 730 is obtained. While the value does not appear to be similar to structures 710 and 720, it does contain a null value, which is often used to terminate linked-lists, thus indicating that these structures 710 and 720 appear to be valid. Thus, by drilling down through multiple layers of structures, each subsequent layer of apparent valid data (i.e. the variable data of the overlaid is within the expected range) adds further proof to the prior structures' validation. Thus, a good determination can be made that the variable 701 which contained memory address 750*a* was a valid initial address for the sought-after structure.

The final search process is one in which the internal redundancy of the operating system is exploited to self-verify the integrity of the system and crawl through linked structures. One such example of this is the relationship between threads and processes. A process is the execution of a single instantiation of an application. One process can dispatch multiple execution threads in order to complete its task. As threads perform the actual "work," each process must have at least one thread and, under normal operating conditions, each thread must be owned by one process. In order to avoid detection, malware developers will often remove a process from the system's linked list of processes. Since the process is largely a management structure, the application continues to execute as long as the thread is still linked within the system's list of "threads-to-execute" (as is normal/common in the practice). If the thread is not within the system's linked list of threads, the application for which it is performing the action for will not execute. Therefore, the redundancy search would enumerate all processes. Then, it would enumerate all threads, correlating each thread to a parent process. Should there be a discrepancy between the two (i.e. there is a thread for which a parent process does not exist), that thread is marked as suspicious and one of the other means of searching is initiated to determine the reason for the discrepancy.

Figure 8:
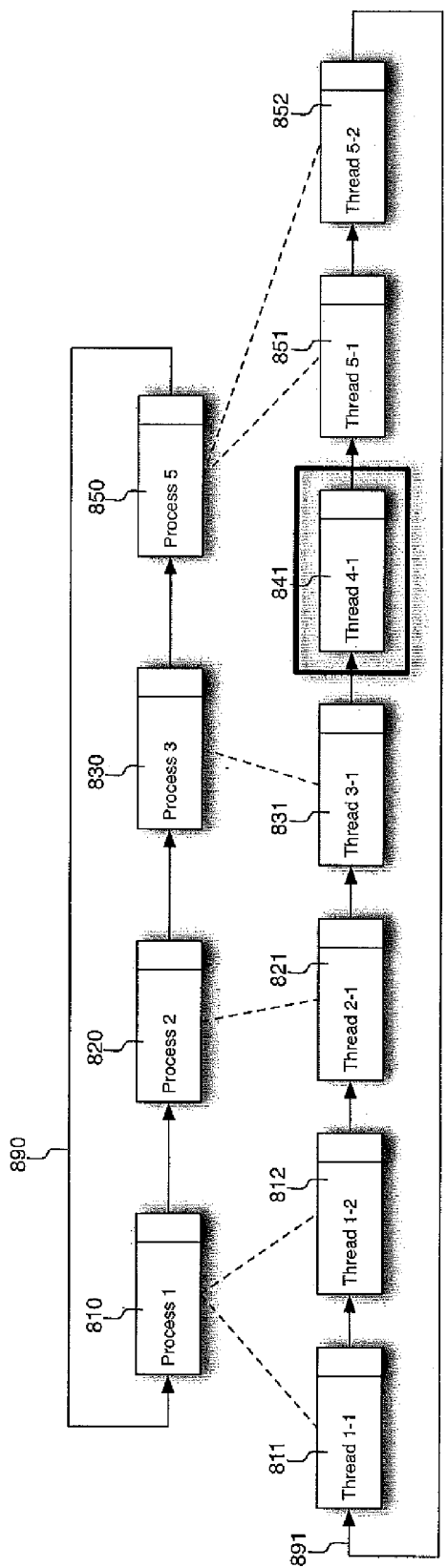
FIG. 8 is a block diagram illustrating the redundancy link search/traversal method.

FIG. 8 demonstrates the redundancy search and enumeration. Processes 1, 2, 3, and 5 are designated as 810, 820, 830, and 850, respectively, with the lines between them representing a linked list of processes. Path 890 represents the tail link back to the starting process that makes the process a circular linked list. Each process has a thread that it "owns" as designated by the dashed line extending between the processes and the threads. Thread 1-1 is designated 811, thread 1-2 is designated 812, thread 2-1 is designated 821, thread 3-1 is designated 831, thread 4-1 is designated 841, thread 5-1 is designated 851, and thread 5-2 is designated 852. The threads are also in represented in a circular linked list with path 891 completing the circular link. Thread 4-1 841 is the suspicious thread because it has no process structure owner as the other threads do, yet it is a member of the thread linked list. Further inspection using the other methods of searching will uncover the suspect process structure.

It should also be noted that these different search methods are not meant to be mutually exclusive, and in fact, when run as complements of one another, they can provide greater confidence in the integrity and accuracy of the search. Additionally, due to the freed memory reclamation process, it is often the case that structures that are no longer in use can remain resident in the physical memory. In fact, testing has found several such structures that remained resident for over four weeks. This residual data can provide greater insight by the forensic analysis system into the malware should any of this data pertain to the malware. Because of this, each search method has a degree of "error" which allows for imprecise matches of structures to also be considered valid. It is left to the user of the system to determine how strict he/she desires the searching and matching process to be.

The forensic analysis system provides for a great deal of flexibility in its operation. There are two principal manners in which the system functions. The first manner is as a stand-alone system (in which the target and the analysis machine is or are the same (11 of FIG. 1) and the second manner is as a distributed system (in which the target system's physical memory replica (39 of FIG. 1) is exported to a separate host such as 12, which performs the analysis upon the physical memory replica (99).

In the stand-alone system, the target analysis host 11 obtains either a physical memory replica 39 of FIG. 1, and accesses the actual physical memory, or RAM, 18 through a software API. These methods are all common and known in the art. The RAM driver collector interface 34 illustrates a universal way to represent access to the physical memory (whether real or replicated). This can also be understood as being the physical memory interface 39/99/310. The RAM driver collector interface 34 presents a standardized view of the physical memory whether it was obtained through hardware, such as port 21, network connections, as by port 22 and network driver 25, or other human interface interaction, such as port 23 and human interface driver 24, which may be, for example, a CD-ROM. The RAM collector software 34*c* of FIG. 1 organizes and manages the collection of the physical memory (real or replicated), output (if desired to a local RAM replica file 39*b*), pre-processes into attribute vectors, and uploads the attribute vectors (and RAM replica, if present) into the attribute vector database 31. The attribute vector analyzer 32 interacts with attribute vector database 31 in order to analyze the new attribute vectors that have been added to the database as well as to update the status of any unknown attribute vectors that previously resided within the database 31. Upon completion of the analysis (and detection of malicious execution paths), the cleanser software 90*b* is initiated and given the attribute vectors that correspond to the malicious execution paths. The cleanser 90*b* then passes the attributes from the attribute vectors which will determine spatial targeting (within the physical memory) to the cleanser driver 90—a privileged piece of software at a higher privilege than the cleanser 90*b*. The cleanser driver 90 then interacts with the CPU 14 in order to access the physical memory 18 directly. The cleanser driver is then able to edit and manipulate the physical memory 18 in order to remove functioning traces of malicious software from physical memory.

Because a stand-alone system (such as that represented by the target host computer system 11 of FIG. 1, with the dash-line elements in place, functions within the same context as potentially malicious software, there is the opportunity for any resident malware to possibly affect the execution and analysis of the system 10. Therefore, a second option is provided within the system 10. That option is one in which the analysis host computer system 12 of the system 10 of FIG. 1 is introduced in addition to the target host computer system 11. Through multiple means, such as RAM interface hardware 41, 71, network interface 42, 72, and human interface 43, 73, the physical memory replica is introduced to analysis host computer system 12. The replica is moved through the appropriate channels, or network and/or human interface drivers 44, 45 (known in the art) and presented to the attribute vector extractor and aggregator 93. Attribute vector extractor and aggregator 93 is much like the RAM collector 34*c* of the target host computer system 11 in that it organizes and manages the collection of the physical memory from RAM replica 99, pre-processes 99 into either known or unknown attribute vectors, and uploads the attribute vectors into the attribute vector database 91. The attribute vector analyzer 92 then interacts with attribute vector database 91 in order to analyze the new known and/or unknown attribute vectors that have been added to the database as well as to update the status of any unknown attribute vectors that previously resided within the database 91. Upon completion of the analysis (and detection of malicious execution paths), the attribute vector analyzer 92 then attempts to initiate contact with the cleanser driver 90 of the target host computer system 11 by way of a path 74. This path 74 can be through networked communications, human interaction (such as through a keyboard), or even through CD-ROM media—anything known in the art. Note that in this method the cleanser driver 90 is initiated and provided with (from attribute vector analyzer 92) the known and/or unknown attribute vectors' spatial targeting characteristics (meaning, physical memory addresses in 18) that correspond to the malicious execution paths. In a manner similar to that of the stand-alone system, the cleanser driver 90 then interacts with the CPU 14 in order to directly access the physical memory 18. The cleanser driver is then able to edit and manipulate the physical memory 18 in order to remove functioning traces of malicious software from physical memory 18.

Additional aspects of the disclosure provide for the existence of a third option in physical memory capture, live capture and pre-analysis. With this model in the two-host system (computer systems 11 and 12), the pre-processing software executes on the target host computer system 11, as opposed to the analysis host computer system 12. Pre-processing of the physical memory 18 is performed on the physical memory 18 of the target host computer system 11 and then these structures are transferred using either data path 72 or data path 73 to the analysis host computer system 12.

The pre-processing and analysis components of the forensic analysis system provide for a manner in which experts can inject their knowledge and aptitude into the system depending upon the algorithms and manners in which they choose to implement the two components. The pre-processing performed by the RAM collector 34c or the attribute vector extractor & aggregator 93 is an extremely important part of the system 10. After all structures have been found in the RAM 18 or replica RAM 39b, verified to the desired confidence (as was described in the search algorithms displayed in conjunction with FIG. 6, FIG. 7, and FIG. 8), and processed (meaning that relationships are determined through following pointers, known in the art), the pre-processing of the structures into attribute vectors begins. Attribute vectors' components can either be user-specified at the start at block 214 in the method of FIG. 2A or they can be selected by performing any one of a number of feature selection algorithms (known in the art) in order to extract the "best" values to be used for comparison. During the analysis, attribute vectors are employed by the attribute vector analyzer 32 and 92 to perform the relational calculations in order to determine the "degrees of likeness" between multiple attribute vectors. Attribute vectors contain information from the physical memory itself, such as structure variable values, as well as metadata that describes each structure or related set of structures. Metadata details information about structures such as a process and its related threads in a system-level context. This system-level context can be used to discern a structure's location in physical memory or the misplacement of a kernel-space structure (and degree to which it is misplaced) within a user-space address range. Additional steps taken during this pre-processing stage include the normalization (if so desired by the user) of ordinal data values, determination of the method for handling of categorical data, and additional data mining activities that are well-known in the art.

When performing a live (i.e. "online") analysis, there tends to be less of the desire to collect data for later analysis and a greater desire to perform relational analysis on the current data. When employing either live or offline analysis, after the physical memory has been searched for structures, verified, pre-processed, and arrayed into attribute vectors, the attribute vectors can either be loaded into the attribute vector database 31 or 91 or used in the next step, analysis by the attribute vector analyzer 32 or 92. If there is the analysis host computer system 12 involved in the analysis, then the attribute vector database 31 or 91 typically resides on the analysis host computer system 12. In FIG. 1, the dashed objects represent elements of the system 10 that are typically present in a live or stand-alone forensic system analysis. These "dashed" elements are not needed on the target host computer system 11 in a distributed forensic analysis system because they are present (in a more secure environment) on the analysis host computer system 12. This division of responsibilities provides security (confidence, integrity, and availability) for the analysis to be performed by the attribute vector analyzer 32 or 92 as well as for data retention in the attribute vector database 31 or 91 of attribute vectors, structures, and physical memory files to be used in comparison for future relational comparisons.

It is desirable to examine the attribute vector database because its initial setup and ongoing management are important to the relational analysis stage. As an overview, the attribute vector database 31 or 91 is a relational database of any flavor, typically (during off-line analyses) set-up, run, and administered on the second, or analysis, host. The attribute vector database can also be present on the target host computer system 11 when employing a stand-alone forensic analysis system (which can be either live (i.e. online) or offline. No change to the standard operating procedures behind these tasks is contemplated or necessary as they relate to relational databases of any kind, and these procedures are well known. The data that is initially stored within the database will include data from host computer systems of known states whose attribute vectors have been pre-processed, analyzed, and classified as known-state attribute vectors. This means that attribute vectors, structures, etc. and the physical memory file from one or more host computer systems are uploaded into the database prior to operation on host computer systems of unknown states. Known-state host computer systems contain known malware or are known to be free from malware. In order to be a known-state host computer system, the user should have beyond a reasonable doubt that (a) if considered an uncompromised host computer system, a host computer system's integrity is fully intact or (b) if considered a compromised host computer system, the intended piece of malware is the only one resident on that host and it is designated within the database. Loading of known-state host computer systems into the database can occur continuously, as long as these entries are marked as known-state within the database schema. During both the initial loading and ongoing execution, the database performs data mining operations and analysis (by the attribute vector analyzer 32 or 92 in order to determine new relationships that can be exploited when examining known-state host computer system information against unknown-state host computer system information.

When the attribute vector analyzer 32 of FIG. 1 is executing the analysis component during a live, stand-alone analysis, a fully-loaded attribute vector database 31 is often not employed on the target host computer system 11. A reduced-memory fingerprint attribute vector database will be used. Due to current constraints of databases and the amount of physical memory 18 that they tend to occupy during execution, they would tend to monopolize active memory. Therefore, both known and unknown historical attribute vectors are limited to either what is loaded into the software or can be dynamically loaded and transmitted if the analysis software has access to a back-end data repository—through either a network connection, null modem, CD-ROM, or other communication strategy common in the art. When not employing a database, the analysis software completes a sweep of the physical memory and all relative objects (in its entirety). It then alternatively uses either its back-end repository (as through a connection through paths 71, 72, or 73) to the attribute vector database 91) of the analysis host computer system 12, or pre-loaded historical attribute vectors to perform the analysis in order to determine the presence of malicious software.

The Attribute Vector Database (31 or 91) of FIG. 1 is responsible for storing the attribute vectors for the current, as well as future, analyses, and in addition, assisting with the relational analysis of the newest attribute vectors with the previously stored attribute vectors. After the searching and database upload have been completed by the Attribute Vector Extractor and Aggregator 33/93, each process (or execution path) and its related attribute vector are then compared against other historical attribute vectors using any one of a number of comparative or comparison algorithms known in the art, such as clustering or cosine similarity. The historical attribute vectors can be of both known and unknown states; however, generally known-state attribute vectors provide a more accurate identification. Additionally, the new attribute vectors are not the only adjudicated attribute vectors. Unknown historical attribute vectors can also have their states changed to a known-state (malicious or benign) if sufficient evidence is found to support such an assertion (due to the introduction of the new attribute vectors and their related relationships).

Once the state of a process or execution path is discovered in the analysis component, two events occur, namely (a) to separate the malicious processes from the benign, and (b) to start the cleansing process. The target event occurs after the location details are transferred (74 or 74*b*) to the cleansing component (either the Cleanser Driver 90 or Cleanser 90*b*) on the target computer 11. The transfer can be done through any number of methods, including network-based transfer, manual entry by an operator, or transfer over a null modem. The information being transmitted allows the cleansing component of the system to target the process or execution path deemed to be malicious, and to logically separate those pieces from the benign operating system and software. The second event that takes place is the initiation of the cleansing process.

The cleansing component, though programmatically complicated due to the necessity to interact with the operating system at an extremely privileged level, provides the ability to remove only the areas of memory that are determined to be malicious without affecting the execution of the target host. The Cleanser 90*b* or Cleanser Driver 90 must accomplish 5 tasks in order to successfully complete its objective of removing software with malicious intent from the target of the analysis. It must perform the following: 1.) Determine all areas of physical memory that are related to the malware, 2.) Determine, if applicable, the operating system control structures that are used to schedule and execute the malware, 3.) Remove, replace, or correct any control structures which transfer control (either at an application or operating system level) to the malware, 4.) Obtain malware-specific, supporting (i.e. non-executing) physical memory locations (such as heaps) and either mark the locations as unused (and thus reclaimable by the operating system) or manually zero-out and release the memory locations to the operating system, 5.) Terminate purity and allow for the target to continue execution as normal. The most difficult task to complete is the determination of which areas of memory are outright malicious activity and which areas support the malicious activity. Because this is completed in the attribute vector creation components (34*c* and 93) and the Attribute Vector Analyzers (32 and 92) and then the results are transferred to either the Cleanser Driver 90 or the Cleanser 90*b*, Purity can actually employ methods described in the Ring, et al. reference and common in the art in order to remove those offending processes and execution paths from the physical memory.

Using information supplied to the Cleanser 90*b* or Cleanser Driver 90 from the analysis stage (which for ease can be in the form of an attribute vector and obtained through any network-based or human-entered means), the Cleanser 90*b* or Cleanser Driver 90 again crawls through memory verifying the memory locations listed within the attribute vector and attempts to discover any additional structures that might be part of the process or execution path. These memory locations and structures are all maintained within the Cleanser's 90*b* or Cleanser Driver's 90 shrunken and contained memory space (so as to decrease its physical memory footprint) and used in the next stage.

After all parts of the malicious process or executable path have been determined, it is necessary for the Cleanser 90*b* or Cleanser Driver 90 to terminate the malware through indirect methods. Because malware can hijack valid processes or inject malicious commands into valid executable paths, it is not enough to simply terminate a process, as it might be valid or necessary to the operation of the host. The Cleanser 90*b* or Cleanser Driver 90 performs the removal of the malware in any combination of three primary ways: 1.) Removal of "pointers" from linked lists, 2.) Replacement of executable code with "sterile" or harmless code that allows the processor to execute the region without performing any "real" task, and 3.) Correction of "hooked" or "patched" pointers that the malware had injected into memory areas in order to re-route the execution flow to a desired code area. The Cleanser 90*b* or Cleanser Driver 90, however, is not limited to these methods of malware removal. Malware of lesser complexity will not retain the means or abilities with which to create strong links into the system, and therefore, will not require low-level interference by the Cleanser 90*b* or Cleanser Driver 90. Due to the fact that Purity is using similarity analysis, the Cleanser 90*b* or Cleanser Driver 90 will be able to correct and remove even high-level malware based upon similarities or outliers when compared with other benign and malicious software.

The disclosure relates, at least in part, to a process that can be used to detect and remove malicious software from a host through the employment of physical memory analysis and relational data mining. While presented as a single process, there are numerous paths of execution that can be taken based upon human or automated interaction. The ability to choose different paths of the inspection (while maintaining a uniform overall process), allows much greater accuracy in malware determination and removal. In addition, it may serve as a seminal foundation upon which future physical memory analysis processes and methods can be built.

Active (or "running") processes are those that are running on the target host at the time of collection of the physical memory. We can still deem those processes in the physical memory raw flat file to be "active" with respect to the target computer 11, even though they are of course, not actually executing once they are being analyzed. Inactive processes are those that are still resident in physical memory because they are not "cleaned up" by the operating system's memory management.

Additionally the disclosure provides for the existence of a third option in physical memory capture, live capture and pre-analysis. With this model, the pre-processing software executes on the target computer 11, as opposed to the analysis computer 12. Pre-processing of the memory is performed on the physical memory of the target machine and then these structures are transferred using 40 to the analysis machine 12.

While exemplary drawings and specific embodiments have been described and illustrated herein, it is to be understood that that the scope of the present disclosure is not to be limited to the particular embodiments discussed. Thus, the embodiments shall be regarded as illustrative rather than restrictive, and it should be understood that variations may be made in those embodiments by persons skilled in the art without departing from the scope of the present invention as set forth in the claims that follow and their structural and functional equivalents.

What is claimed is:

1. A method for cleansing malicious data from a memory of a computer, the method comprising:
   in a first computer process, extracting attributes from a set of training data including benign, non-corrupted acceptable training data and/or malicious training data;
   in a second computer process, forming attribute vectors from the attributes extracted from the training data, wherein said attribute vectors comprise a data structure that represents at least: processes, execution paths, drivers, and kernel objects relating to the training data;
   in a third computer process, comparing attribute vectors formed from data of an unknown type contained in the memory with the attribute vectors formed from the training data to determine which ones of the attribute vectors formed from the data contained in the memory are similar or dissimilar to the attribute vectors formed from the training data, wherein the data of the unknown type is deemed malicious if its attribute vectors are similar to the attribute vectors of the malicious training data and wherein the data of the unknown type is deemed malicious if its attribute vectors are dissimilar to the attribute vectors of the benign, non-corrupted acceptable training data;
   removing from the memory of the computer the data of the unknown type deemed malicious.

2. The method of claim 1, further comprising loading the attribute vectors formed from the attributes extracted from the training data into a database prior to performing the third computer process.

3. The method of claim 2, wherein the first and second computer processes are performed by a first computer and wherein the database is defined by a second computer.

4. The method of claim 3, wherein the third computer process is performed by the second computer.

5. The method of claim 1, wherein the data includes processes and/or execution paths.

6. The method of claim 5, wherein the processes are active/ and or inactive and wherein the execution paths are active and/or inactive.

7. The method of claim 1, wherein the memory comprises a volatile memory.

8. The method of claim 1, wherein the third computer process includes mathematically aggregating and analyzing the attribute vectors formed from the attributes extracted from the training data.

9. A system for cleansing malicious data from a memory of a computer, the system comprising:
   one or more processors executing instructions for:
      extracting attributes from a set of training data including benign, non-corrupted acceptable training data and/or malicious training data;
      forming attribute vectors from the attributes extracted from the training data, wherein said attribute vectors comprise a data structure that represents at least: processes, execution paths, drivers, and kernel objects relating to the training data;
      comparing attribute vectors formed from data of an unknown type contained in the memory to the attribute vectors formed from the training data to determine which ones of the attribute vectors formed from the data contained in the memory are similar or dissimilar to the attribute vectors formed from the training data, wherein the data of the unknown type is deemed malicious if its attribute vectors are similar to the attribute vectors of the malicious training data and wherein the data of the unknown type is deemed malicious if its attribute vectors are dissimilar to the attribute vectors of the benign, non-corrupted acceptable training data;
   removing from the memory of the computer the data of the unknown type deemed malicious.

10. The system of claim 9, further comprising instructions executed by the one or more processors for loading the attribute vectors formed from the attributes extracted from the training data into a database prior to extracting the attributes.

11. The system of claim 10, wherein a first one of the one or more processors is a component of the computer and executes the instructions for the attribute extracting and the attribute vector forming and further comprising a second computer defining the database.

12. The system of claim 11, wherein a second one of the one or more processors is a component of the second computer and executes the instructions for comparing the attribute vectors.

13. The system of claim 9, wherein the data includes processes and/or execution paths.

14. The system of claim 13, wherein the processes are active and/or inactive and wherein the execution paths are active and/or inactive.

15. The system of claim 9, wherein the memory comprises a volatile memory.

* * * * *